United States Patent
Iketani et al.

(10) Patent No.: US 8,407,024 B2
(45) Date of Patent: Mar. 26, 2013

(54) MOTION DETERMINATION APPARATUS, METHOD AND COMPUTER READABLE MEDIUM

(75) Inventors: Naoki Iketani, Kunitachi (JP); Kenta Cho, Suginami-ku (JP); Yuzo Okamoto, Yokohama (JP); Hisao Setoguchi, Kawasaki (JP); Masanori Hattori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 276 days.

(21) Appl. No.: 12/885,730

(22) Filed: Sep. 20, 2010

(65) Prior Publication Data

US 2011/0246122 A1 Oct. 6, 2011

(30) Foreign Application Priority Data

Mar. 31, 2010 (JP) ................................. 2010-084330

(51) Int. Cl.
*G06F 15/00* (2006.01)
(52) U.S. Cl. ........................................................ 702/160
(58) Field of Classification Search .................. 702/160
See application file for complete search history.

(56) References Cited

U.S. PATENT DOCUMENTS

2010/0070235 A1* 3/2010 Cho et al. ...................... 702/141

FOREIGN PATENT DOCUMENTS

| JP | 2009-160341 | 7/2009 |
| JP | 2010-213782 | 9/2010 |

OTHER PUBLICATIONS

Japanese Office Action for Japanese Application No. 2010-084330 issued on Feb. 14, 2012.
Hattori, Kanako, et al., "Human Behavior analysis using positioning data", The 21st Annual Conference of the Japanese Society for Artificial Intelligence, 2007, pp. 1-4.

* cited by examiner

*Primary Examiner* — Tung S Lau
(74) *Attorney, Agent, or Firm* — Turocy & Watson, LLP

(57) ABSTRACT

In one embodiment, a motion determination apparatus includes: a basic motion determination module determining a basic motion of a user, based on a sensor signal for detecting a motion of the user; a basic motion recording module recording the basic motion in a temporal sequence; a motion scene determination table configured to store the basic motion and a condition under which the basic motion occurs, for each motion scene; a motion scene determination module determining that the basic motion recorded in the temporal sequence corresponds to a certain motion scene, based on the motion scene determination table; a detailed label determination table storing a detailed label indicating a detailed motion in the motion scene, for each motion scene; and a detailed label determination module determining that the basic motion included in the motion scene corresponds to a certain detailed label, based on the detailed label determination table.

5 Claims, 8 Drawing Sheets

| MOTION SCENE | BASIC MOTION | CONDITION | DETAILED LABEL |
|---|---|---|---|
| MATERIAL HANDLING | WALKING | BENDING DOWN=0 | TO MATERIAL YARD |
| | | BENDING DOWN≧1 | MATERIAL TRANSPORTING |
| | BENDING DOWN | | MATERIAL LOADING |
| ASSEMBLING | STOP | STOP=0 | CASE ASSEMBLING |
| | | STOP≧1 | PACKAGING |
| | ANY | STOP≧1 | SCREWED SHUT |
| CLEANING | BENDING DOWN | | TRASH COLLECTION |
| | STOP | | WIPING |
| | WALKING | | MOPPING |

*FIG. 3*

| TIME | BASIC MOTION |
|---|---|
| 15:00:00~15:01:30 | WALKING |
| 15:01:30~15:02:30 | STOP |
| 15:02:30~15:02:40 | BENDING DOWN |
| 15:02:40~15:04:10 | WALKING |
| 15:04:10~15:08:50 | STOP |
| 15:08:50~15:09:30 | OBSCURE |
| 15:09:30~15:12:00 | STOP |
| 15:12:00~15:14:00 | WALKING |
| 15:14:00~15:14:10 | BENDING DOWN |
| 15:14:10~15:14:50 | WALKING |
| 15:14:50~15:15:50 | STOP |
| 15:15:50~15:16:40 | WALKING |

FIG. 4

| MOTION SCENE | TIME SPAN | BASIC MOTION GENERATION CONDITION |
|---|---|---|
| MATERIAL HANDLING | 3 TO 5 MINUTES | RATIO: 75%≦WALKING<95%<br>TIMES: BENDING DOWN≧ONE TIME |
| ASSEMBLING | 7 TO 11 MINUTES | RATIO: STOP≧75%<br>ORDER: STOP-1 (45-55%)<br>→ANY (10~30%)<br>→STOP-2 (25-35%) |
| CLEANING | 5 TO 10 MINUTES | RATIO: STOP≧30%<br>TIMES: BENDING DOWN≧ONE TIME |

FIG. 6

| MOTION SCENE | BASIC MOTION | CONDITION | DETAILED LABEL |
|---|---|---|---|
| MATERIAL HANDLING | WALKING | BENDING DOWN=0 | TO MATERIAL YARD |
| | | BENDING DOWN≧1 | MATERIAL TRANSPORTING |
| | BENDING DOWN | | MATERIAL LOADING |
| ASSEMBLING | STOP | STOP=0 | CASE ASSEMBLING |
| | | STOP≧1 | PACKAGING |
| | ANY | STOP≧1 | SCREWED SHUT |
| CLEANING | BENDING DOWN | | TRASH COLLECTION |
| | STOP | | WIPING |
| | WALKING | | MOPPING |

*FIG. 7*

| TIME | DETERMINATION DETAILED LABEL |
|---|---|
| 15:00:00~15:01:30 | TO MATERIAL YARD |
| 15:01:30~15:02:30 | STOP |
| 15:02:30~15:02:40 | MATERIAL LOADING |
| 15:02:40~15:04:10 | MATERIAL TRANSPORTING |
| 15:04:10~15:08:50 | CASE ASSEMBLING |
| 15:08:50~15:09:30 | SCREWED SHUT |
| 15:09:30~15:12:00 | PACKAGING |
| 15:12:00~15:14:00 | MOPPING |
| 15:14:00~15:14:10 | TRASH COLLECTION |
| 15:14:10~15:14:50 | MOPPING |
| 15:14:50~15:15:50 | WIPING |
| 15:15:50~15:16:40 | MOPPING |

FIG. 8

| MOTION SCENE | BASIC MOTION | CONDITION | DETAILED LABEL |
|---|---|---|---|
| MATERIAL HANDLING | WALKING | BENDING DOWN=0 | TO MATERIAL YARD |
| | | BENDING DOWN≧1 | MATERIAL TRANSPORTING |
| | BENDING DOWN | | MATERIAL LOADING |
| ASSEMBLING | STOP | STOP=0 & ELAPSED TIME<1min | INTERNAL ASSEMBLING |
| | | STOP=0 & ELAPSED TIME≧1min | COVER ASSEMBLING |
| | ANY | STOP≧1 | PACKAGING |
| | | STOP≧1 & ELAPSED TIME<3min | UPPER MODULE SCREWED SHUT |
| | | STOP≧1 & ELAPSED TIME≧3min | LOWER MODULE SCREWED SHUT |
| CLEANING | BENDING DOWN | | TRASH COLLECTION |
| | STOP | | WIPING |
| | WALKING | | MOPPING |

MOTION DETERMINATION APPARATUS, METHOD AND COMPUTER READABLE MEDIUM

This application claims priority from Japanese Patent Application No. 2010-084330, filed on Mar. 31, 2010, the entire contents of which are hereby incorporated by reference.

BACKGROUND

1. Field

Embodiments described herein generally relate to a motion determination apparatus which determines a motion of a user using a sensor.

2. Description of the Related Art there has been used a technique for determining a motion situation of a user using a sensor.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 3 is a diagram illustrating time series information on a basic motion recorded in a basic motion buffer module 130;

FIG. 4 is a diagram illustrating a motion scene determination table;

FIG. 6 is a diagram illustrating a detailed label determination table for every motion scene;

FIG. 7 is a diagram illustrating detailed labels determined with respect to respective times; and FIG. 8 is a diagram illustrating a detailed label determination table for every motion scene.

DETAILED DESCRIPTION

According to exemplary embodiments of the present invention, there is provided a motion determination apparatus. The apparatus includes: a basic motion determination module configured to determine a basic motion of a user, based on a sensor signal for detecting a motion of the user; a basic motion recording module configured to record the basic motion in a temporal sequence; a motion scene determination table configured to store the basic motion and a condition under which the basic motion occurs, for each motion scene; a motion scene determination module configured to determine that the basic motion recorded in the temporal sequence corresponds to a certain motion scene, based on the motion scene determination table; a detailed label determination table configured to store a detailed label indicating a detailed motion in the motion scene, for each motion scene; and a detailed label determination module configured to determine that the basic motion included in the motion scene corresponds to a certain detailed label, based on the detailed label determination table.

Hereinafter, an embodiment of the present invention will be described with reference to the accompanying drawings.

Figure 1:
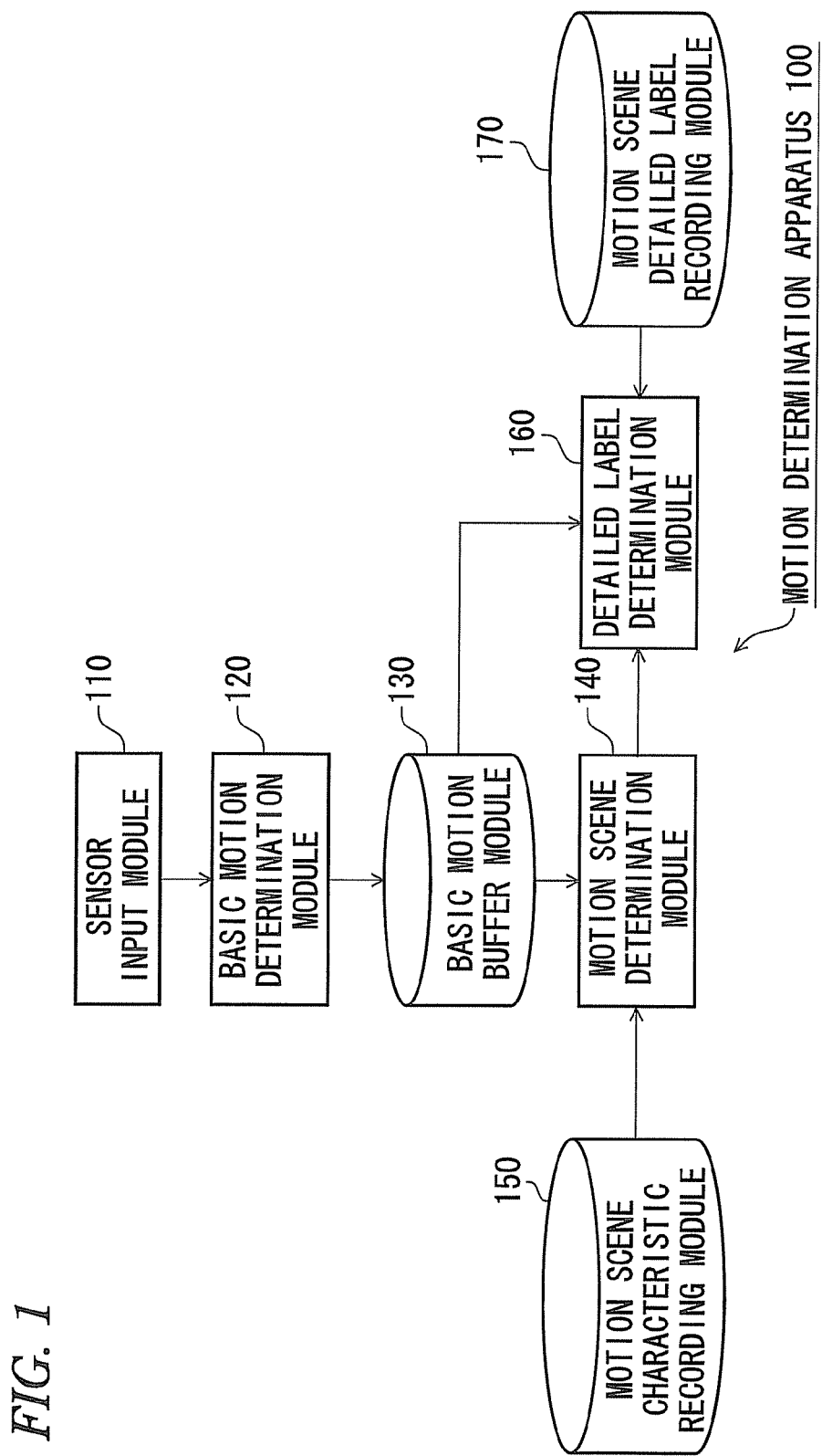
FIG. 1 is a block diagram illustrating a motion determination apparatus according to an embodiment of the present invention.
Figure 2:
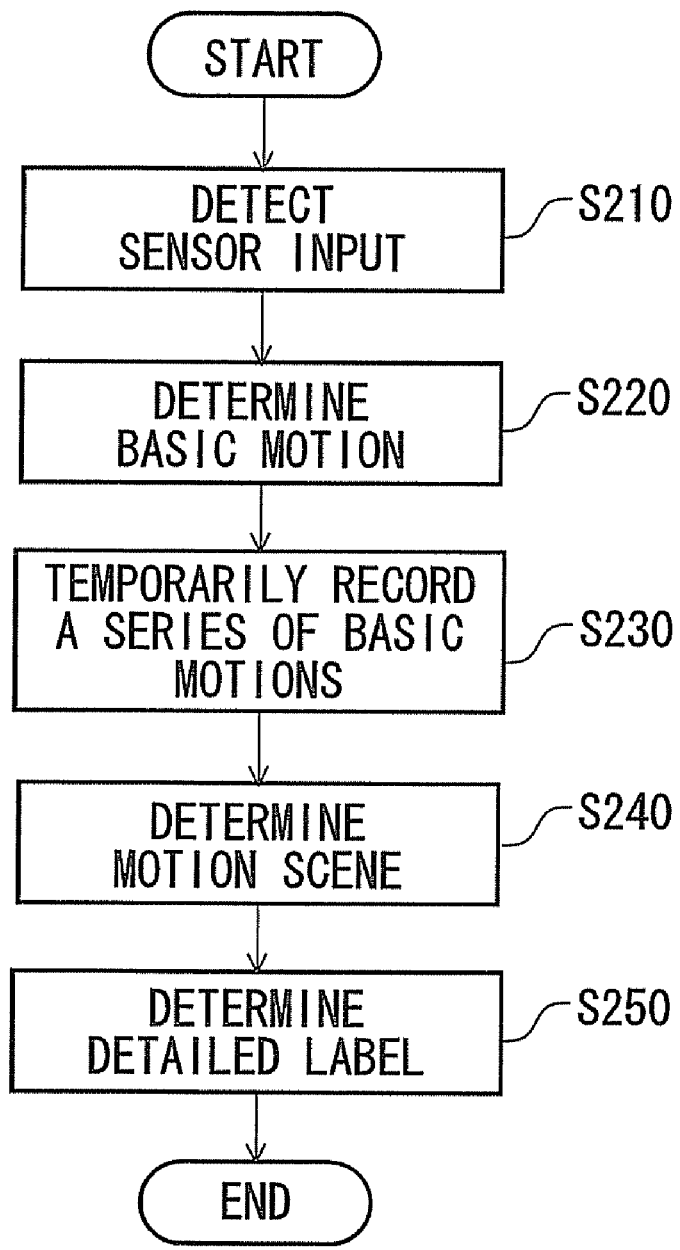
FIG. 2 is a flowchart illustrating a motion determination process according to the present embodiment.

FIG. 1 is a block diagram illustrating a motion determination apparatus 100 according to an embodiment of the present invention, and FIG. 2 is a flowchart illustrating a motion determination process according to the present embodiment.

The present embodiment will be schematically described. Firstly, a basic or simple motion (hereinafter, referred to as a "basic motion") of a user is determined from sensor information. Then, it is determined that a combination of the basic motions which are continuously conducted corresponds to a certain motion scene. Further, a detailed label indicating a certain specified or detailed motion included in the corresponding motion scene is determined, and thus, a detailed motion of the user is finally determined.

(Motion Scene Determination Process)

A motion scene determination process will be described with reference to the flowchart in FIG. 2.

A sensor input module 110 detects a plurality of motions of a user (S210). In the present embodiment, a tri-axial acceleration sensor provided in a portable terminal which is carried by the user corresponds to the sensor input module 110. Further, other examples of the sensor provided in the portable terminal may include a gyro or geo-magnetic sensor, a camera or the like, or similarly, a combination of a plurality of sensors.

A basic motion determination module 120 recognizes the type of a plurality of basic motions of the user from an input signal of the sensor input module 110 after detection of the motions of the user (S220). Three continuing states of "stop", "walking" and "running" and a temporarily occurring motion of "bending down" may be determined as the basic motions. To this end, for example, if the dispersion value of acceleration signals for a given time span (5 to 10 seconds or so) is an extremely small value smaller than a first threshold value, the basic motions may be determined as the "stop" motion; if the dispersion value is equal to or larger than a second threshold value and is equal to or smaller than a third threshold value, the basic motion may be determined as the "walking" motion; and if the dispersion value is larger than the third threshold value, the basic motion may be determined as the "running" motion. Further, the "bending down" motion may be determined using the following relation, $$\cos\theta = (At \cdot At-1)/(|At||At-1|)$$

where At represents an acceleration vector at a certain time, At−1 represents an acceleration vector one second before, and θ represents the angle between the vectors At and At−1. Here, if cos θ is equal to or larger than a certain threshold, the basic motion may be determined as the "bending down" motion. In this way, the basic motion determination module 120 can determine from the input signal of the sensor input module 110 whether a certain basic motion is conducted or no basic motion occurs at each time.

A basic motion buffer module 130 records the basic motions determined by the basic motion determination module 120 and the times during which the motions have been continuously conducted in a chronological order (S230). In the present embodiment, a memory in the portable terminal of the user corresponds to the basic motion buffer module 130. An example of time series information temporarily recorded in the basic motion buffer module 130 is shown in FIG. 3, which illustrates an example of the time series information including a starting time and an ending time for a series of basic motions.

A motion scene determination module 140 determines a motion scene from the time series information of the basic motion recorded in the basic motion buffer module 130 and from a motion scene characteristic recording module 150 which is prepared in advance (S240). The motion scene characteristic recording module 150 records a characteristic indicating which basic motion forms each motion scene which is a determination target. Here, the motion scene refers to a scene including a plurality of basic motions, and may be defined as a scene having a continuous time longer than that of one basic motion. That is, it is possible to sort the basic motions in a predefined motion scene.

In the present embodiment, a motion scene determination table as shown in FIG. 4 is stored in the motion scene characteristic recording module 150. In FIG. 4, three motion scenes of "material handling", "assembling" and "cleaning" are defined as motion scenes of a worker at a specific factory. With respect to each of the three motion scenes, a different characteristic is written as a combination of a time span and a basic motion occurrence condition. The motion scene determination module 140 determines the motion scene for each time period according to whether the time series information recorded in the basic motion buffer module 130 matches with the condition written in the characteristic.

Here, it is assumed that the motion scene determination module 140 determines, while handling the data recorded in FIG. 3 in the line unit, a plurality of lines continuing from the leading line matches with a certain basic motion occurrence condition. Then, in the data in the first to fourth lines, that is, in the data during 250 seconds between the times "15:00:00" and "15:04:10" are included the basic motion "walking" for 180 seconds and one instance of the basic motion "bending down", which matches with the basic motion occurrence condition and the time span of the motion scene "material handling". Further, the motion scene in this time period does not match other conditions, and thus is determined as the "material handling".

As the same determination is continuously performed, the motion scene between the times of "15:04:10" and "15:12:00" is determined as "assembling", and the motion scene between the times of "15:12:00" and "15:16:40" is determined as "cleaning". In this respect, the indication "ANY" in the second line in the basic motion occurrence condition "order" in the case of the motion scene "assembling" in FIG. 4 is a wild card in the motion scene determination process, which means that "any basic motion may be determined within 10 to 30% of the time span (7 to 11 minutes)".

Further, a plurality of motion scenes is likely to be identified in reality. In preparation for this case, a technique may be used in which the order of priority of motion scenes for allocating the priority to a motion which can be determined as any motion scene is recorded in advance in the motion scene characteristic recording module 150. Alternatively, a likelihood indicating the plausibility of the motion scene determination process according to a rule recorded in the motion scene characteristic recording module 150 is calculated as a value, and the determination may be performed so that this likelihood is maximized.

Figure 5:
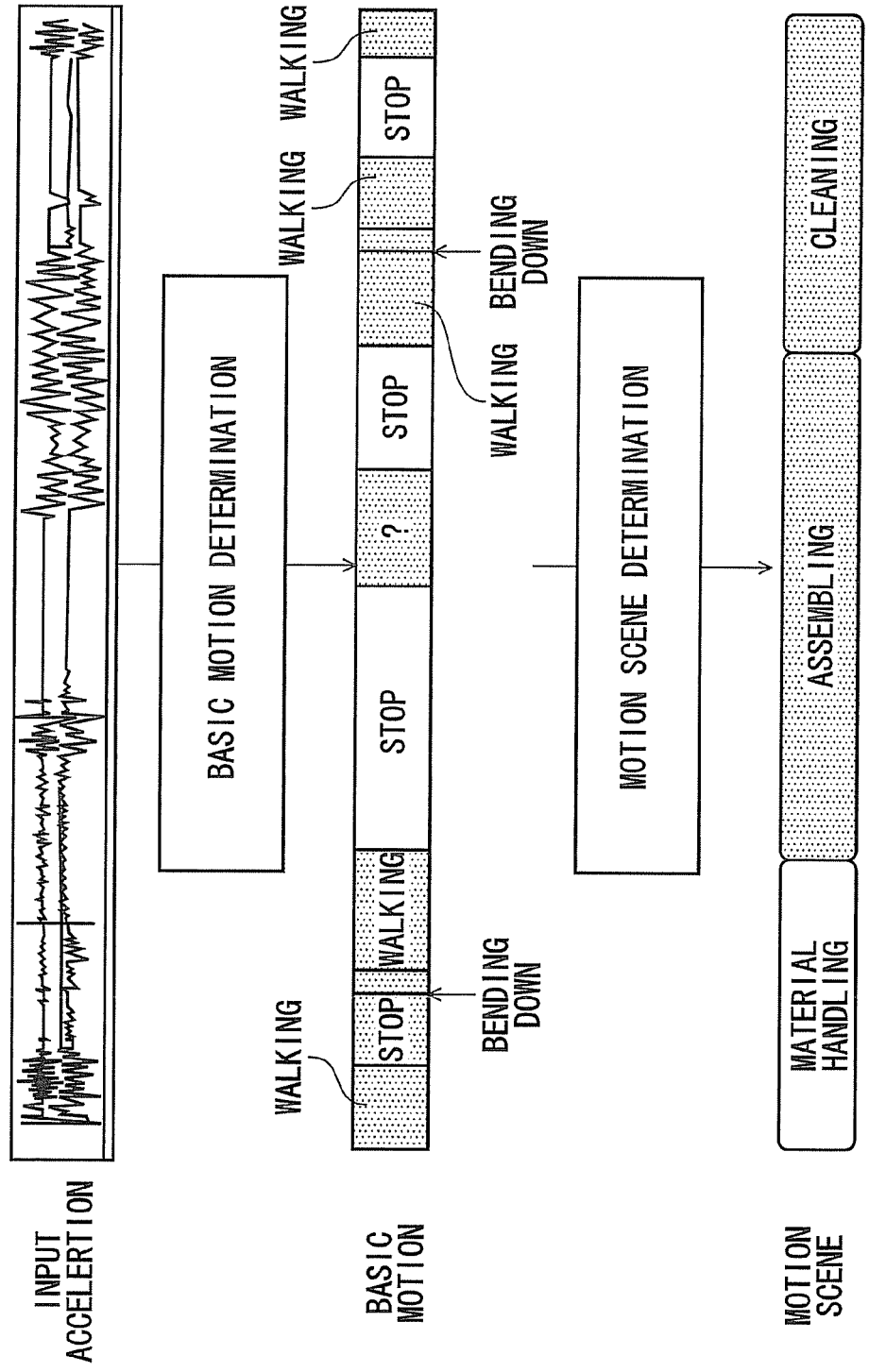
FIG. 5 is a diagram schematically illustrating processes S210 to S240.

FIG. 5 schematically illustrates the above processes (S210 to S240). In this way, even through the basic motions which can be determined are "stop", "walking" and "bending down", the motion scenes of "material handling", "assembling" and "cleaning" can be determined.

(Detailed Label Determination Process)

Next, the process of determining detailed operations in the time period of each determined motion scene will be described.

A detailed label determination module 160 determines a detailed label of the motion scene on the basis of the data from the basic motion buffer module 130 and a detailed label determination table recorded in a motion scene detailed label recording module 170, which is prepared in advance (S250). The data from the basic motion buffer module 130 will be described using an example in FIG. 3, and a detailed label determining rule for every motion scene recorded in the motion scene detailed label recording module 170 will be described using an example in FIG. 6. The detailed label represents a detailed or specific motion in the motion scene.

The detailed label determination process performs, with respect to the motion scene which has been previously determined, determination for each basic motion included in the corresponding period of time. In the case of FIG. 5, the initial basic motion in the motion scene of "material handling" which is firstly determined in a temporal sequence is "walking". However, in the motion scene detailed label recording module 170, there exist two types of detailed labels for the basic motion "walking" of the corresponding motion scene "material handling". Here, a condition matching determination process is performed. The condition ""bending down"=0, or "bending down"≧1" represents the absence or presence of the basic motion "bending down" before the time corresponding to the motion scene "material handling".

In the case of FIG. 5, the motion "bending down" does not occur before the time period of "15:00:00" to "15:04:10" corresponding to the motion scene "material handling". Thus, the detailed label for the time period of "15:00:00" to "15:01:30" is determined as "to material yard". Since "stop" is not written in a field of the basic motion in the motion scene "material handling" in FIG. 6, the detailed label for the time "15:01:30" to "15:02:30" outputs the basic motion "stop" as it is. In this way, as the condition for giving a plurality of detailed labels to one basic motion in a specific motion scene is added to the detailed label determination rule for every motion scene, it is possible to provide detailed labels which are refined more specifically.

The same process is performed for the other motion scenes shown in FIG. 5. In a field of the basic motion of the motion scene "assembling" in FIG. 6 is written the basic motion "ANY". This basic motion "ANY" represents a wild card which matches any motion scene, but in the present embodiment, it is assumed that the degree of priority of the rule written to the upper side is higher. Thus, with respect to the basic motion "stop" for the time "15:04:10" to "15:08:50" corresponding to the motion scene "assembling", the basic motion is determined as "stop", not as the basic motion "ANY" in FIG. 6. Further, since the number of the basic motion "stop" is 0 (zero) before that time, the detailed label is determined as "case assembling".

Through the same process, detailed labels as shown in FIG. 7 can be determined as a result. In this way, even the motion, which is only determined as "walking" through determination over a short time by means of a simple sensor, can be determined as "material handling" or "mopping".

Further, as shown in FIG. 3, the basic motion cannot be determined in the time period between the times of "15:08:50" and "15:09:30", and thus "obscure" is written. However, according to the present embodiment, as shown in FIG. 5, the motion scene determination module 140 determines the motion scene "assembling" on the basis of the basic motions in the other time periods, and sorts "obscure" into the basic motion in the motion scene "assembling". Accordingly, the detailed label determination module 160 can determine the basic motion "ANY" in the motion scene "assembling" in FIG. 6, and can provide a detailed label "screwed shut".

(Modified Embodiment)

In the above-described embodiment, the condition for determining the detailed label is simplified as shown in FIG. 6, for clarity of description. However, a condition as shown in FIG. 8 may be used. In an example in FIG. 8, detailed labels of the motion scene "assembling" are fragmented more specifically. Here, even though the basic motion is the same, the detailed label can be fragmented more specifically by introducing the condition of "elapsed time". That is, referring to FIG. 8, the motion "case assembling" in FIG. 6 is fragmented as "internal assembling" for an initial time smaller than one minute, and is fragmented as "cover assembling" after one minute elapses. The time boundary for the two motions is not strictly limited to one minute. However, by deciding that tasks in the factory require about one minute, it is possible to provide detailed labels.

In addition, for example, if the condition is branched according to "walk count" which is a parameter of the motion "walking" which can be obtained through the sensor input module 110, or if there is "walking" for the time n times longer than the time of "stop" occurring directly before, such a condition for allocating a specific detailed label can be also designated.

According to the present embodiment, even in the case of a plurality of motions which partly has a similar sensor signal series, as the motion scene is determined by including motions which temporally occur before and after, it is possible to accurately recognize specific motions.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. A motion determination apparatus comprising:
   a basic motion determination module configured to determine basic motions of a user, based on sensor signals each representing a motion of the user and detected by a sensor, wherein each of the basic motions corresponds to any one of a stop motion, a walking motion, a running motion, and a bending down motion;
   a basic motion recording module configured to record the basic motions in a temporal sequence;
   a motion scene determination table recording module configured to record a motion scene determination table in which each of the basic motions and a condition under which each of the basic motions occurs are associated with a corresponding one of motion scenes;
   a motion scene determination module configured to determine that each of the basic motions recorded in the temporal sequence corresponds to a certain one of the motion scenes, based on the motion scene determination table;
   a detailed label determination table recording module configured to record a detailed label determination table in which each of detailed labels indicating a detailed motion included in the respective motion scenes is associated with a corresponding one of the motion scenes; and
   a detailed label determination module configured to determine that each of the basic motions corresponds to a certain one of the detailed labels, based on the detailed label determination table.

2. The apparatus of claim 1,
   wherein, in the detailed label determination table, each of label assignment conditions for assigning each of the detailed labels to a corresponding basic motion as well as each of the detailed labels are associated with the corresponding motion scene in a certain motion scene.

3. The apparatus of claim 1,
   wherein the basic motion recording module is configured to record, if there exists a time period which cannot be determined by the basic motion determination module, the time period as an obscure basic motion recognition, and
   wherein the detailed label determination module is configured to determine the detailed label of the time period for the obscure basic motion recognition, based on the detailed label determination table, if the motion scene determination module determines the motion scene including the time period for the obscure basic motion recognition, based on the basic motion in a different time period.

4. A motion determination method, comprising:
   (a) detecting sensor signals each representing a motion of a user by a sensor;
   (b) determining basic motions of the user, based on the sensor signals, wherein each of the basic motions corresponds to any one of a stop motion, a walking motion, a running motion, and a bending down motion;
   (c) recording the basic motions in a temporal sequence in a memory;
   (d) recording, in the memory, a motion scene determination table in which each of the basic motions and a condition under which each of the basic motions occurs are associated with a corresponding one of the motion scenes;
   (e) determining that each of the basic motions recorded in the temporal sequence corresponds to a certain one of the motion scenes, based on the motion scene determination table;
   (f) recording, in the memory, a detailed label determination table in which each of detailed labels indicating a detailed motion included in the respective motion scenes is associated with a corresponding one of the motion scenes; and
   (g) determining that each of the basic motions corresponds to a certain one of the detailed labels, based on the detailed label determination table.

5. A non-transitory computer readable medium storing a program for causing a computer to perform operations comprising:
   (a) determining basic motions of a user, based on sensor signals each representing a motion of the user and detected by a sensor, wherein each of the basic motions corresponds to any one of a stop motion, a walking motion, a running motion, and a bending down motion;
   (b) recording the basic motions in a temporal sequence;
   (c) recording a motion scene determination table in which each of the basic motions and a condition under which each of the basic motions occurs are associated with a corresponding one of motion scenes;

(d) determining that each of the basic motions recorded in the temporal sequence corresponds to a certain one of the motion scenes, based on the motion scene determination table;

(e) recording a detailed label determination table in which each of detailed labels indicating a detailed motion included in the respective motion scenes is associated with a corresponding one of the motion scenes; and (f) determining that each of the basic motions corresponds to a certain one of the detailed labels, based on the detailed label determination table.

* * * * *